Figure 3:
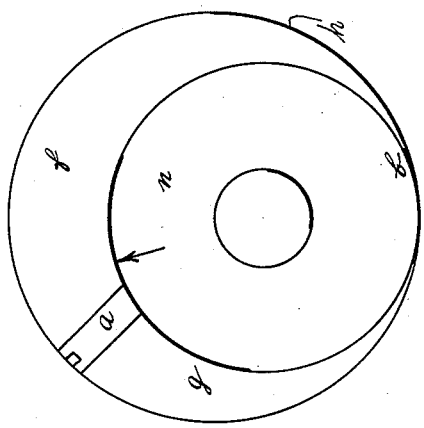
Figure 6:
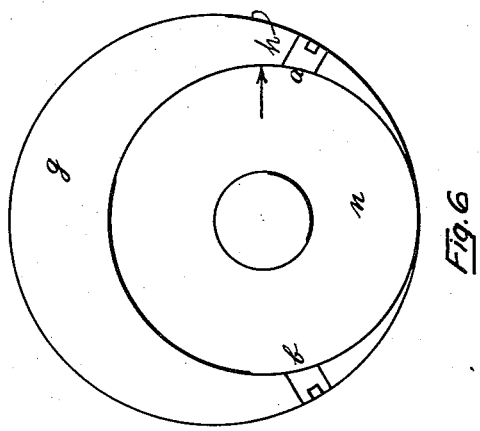
Figure 2:
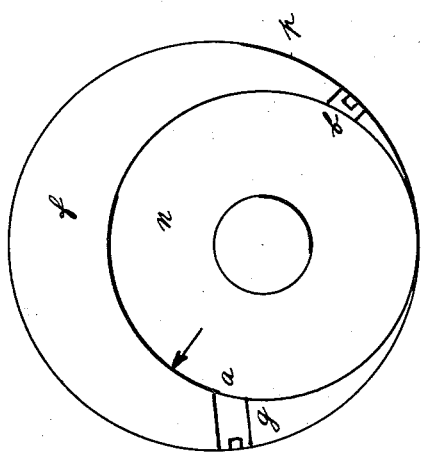
Figure 5:
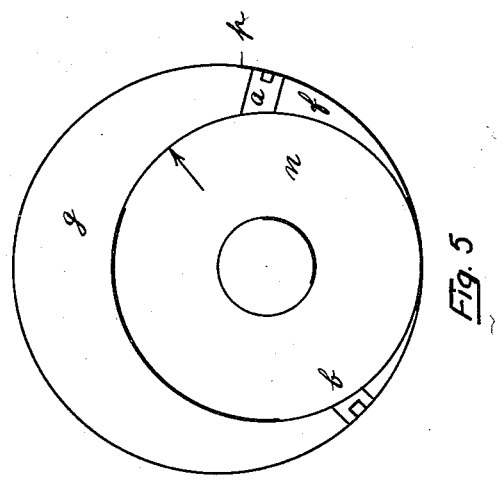
Figure 1:
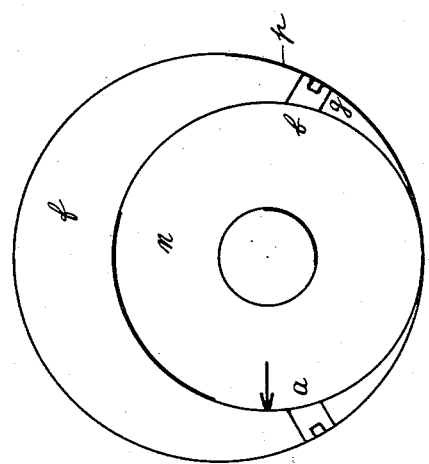
Figure 4:
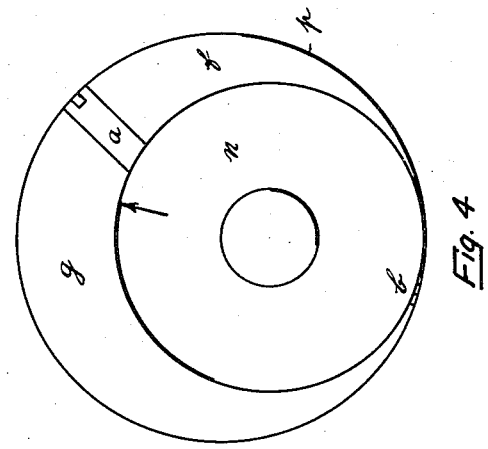
Figure 9:
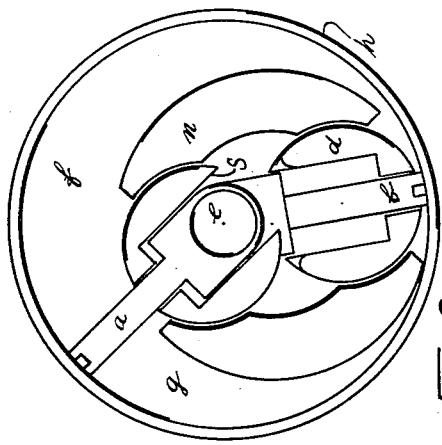
Figure 12:
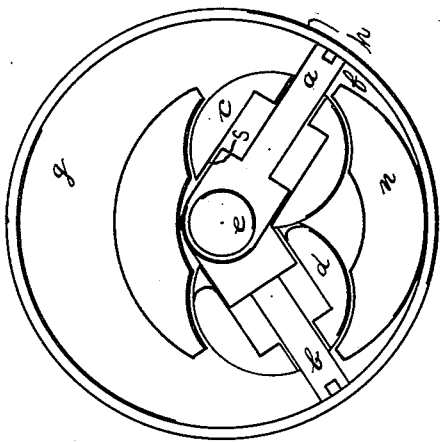
Figure 8:
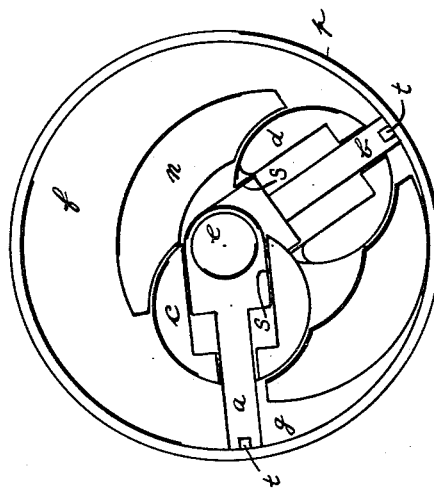
Figure 11:
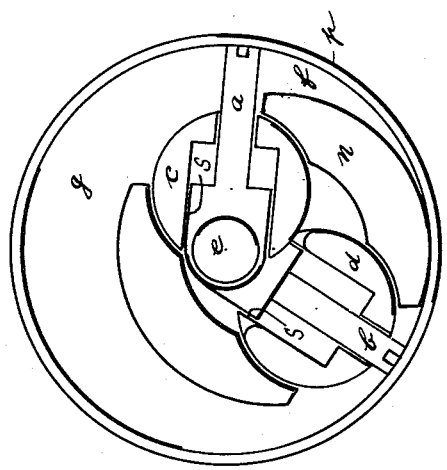
Figure 7:
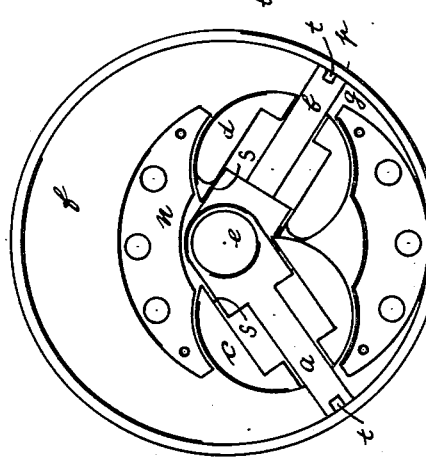
Figure 10:
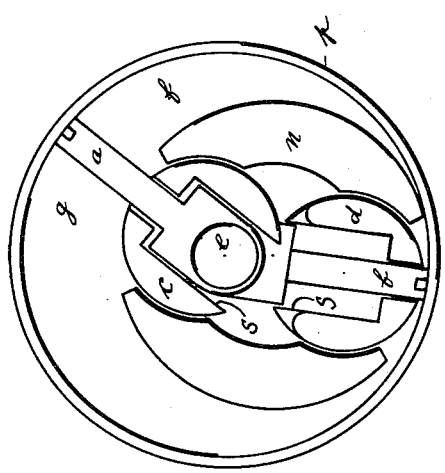

July 10, 1962 A. K. BODYCOMB 3,043,231
VANE TYPE ENGINE, PUMP, FLUID COMPRESSOR, FLOW
METER AND THE LIKE
Filed Sept. 14, 1959 6 Sheets-Sheet 1

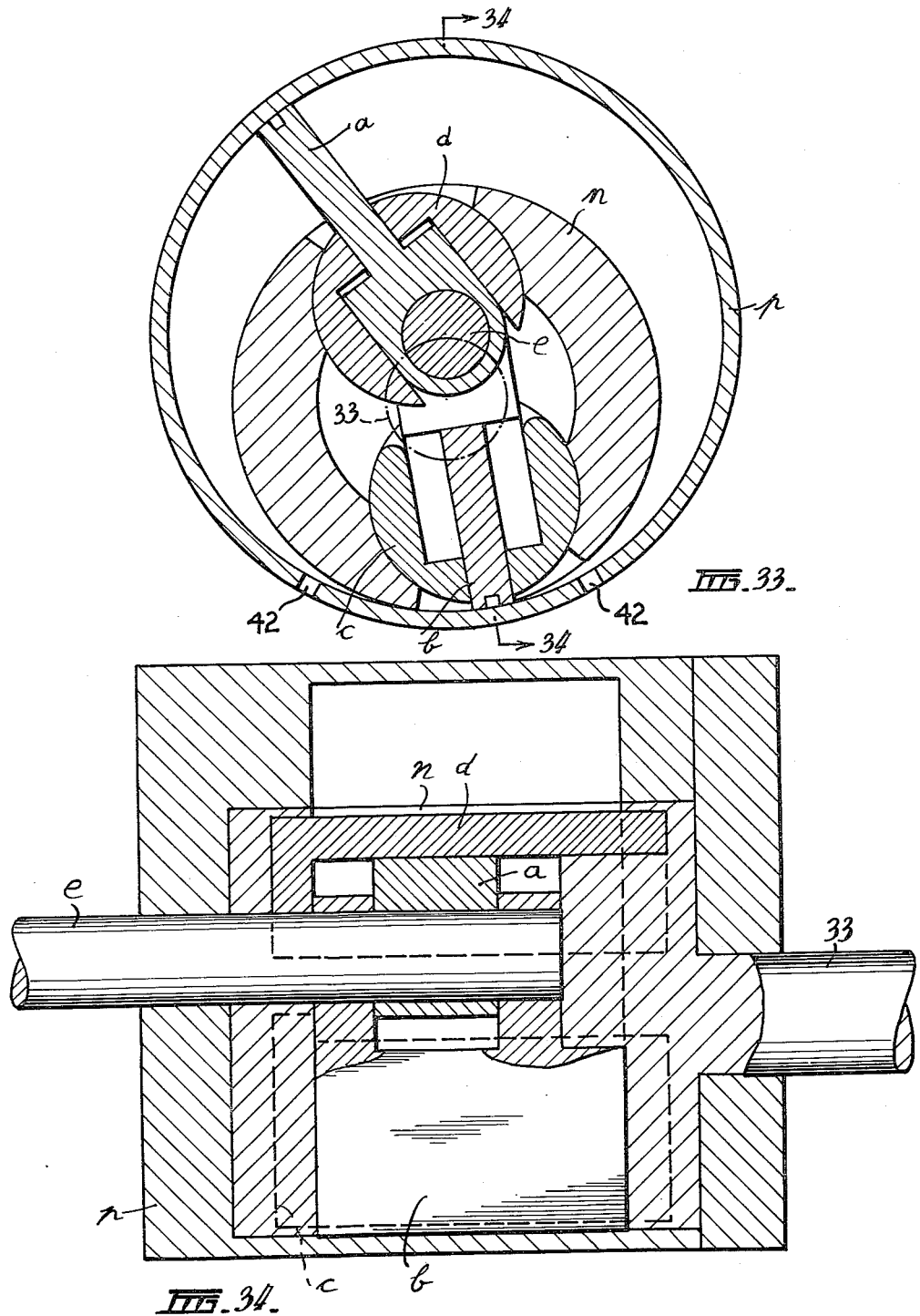

United States Patent Office 3,043,231
Patented July 10, 1962

3,043,231
VANE TYPE ENGINE, PUMP, FLUID COMPRESSOR, FLOW METER AND THE LIKE
Alistair Kenyon Bodycomb, 377 Toorak Road, South Yarra, Victoria, Australia
Filed Sept. 14, 1959, Ser. No. 839,850
6 Claims. (Cl. 103—144)

This invention relates to pumps, compressors, air engines, flow meters and the like devices, and to constructions thereof using the non-reciprocating offset vane principle, wherein the vanes are actuated and driven around the inside of a casing by an offset rotor containing a guide for each vane, of which there may be one or more.

Particularly the invention relates to the construction, operation and arrangement of a rotor, vanes and vane guides for use in constructions of the kind set forth.

The principle of a vane rotating about a control shaft and working through a vane guide housed in a rotor is well known, but in accordance with this invention, the construction, arrangement and operation of these components have been greatly improved, and constructions such as motors, pumps, engines, compressors and the like employing them are greatly increased in efficiency and effectiveness, while at the same time their overall dimensions for any given ratings, may be greatly reduced.

In the past, it has been thought that the vane guides need to pass above the bearing shell of the vane or vanes on a central control shaft, but in accordance with the present invention, as a vane guide approaches the central shaft the slot in the vane guide through which the vane moves, passes over the control shaft, for the reason that the said slot is arranged to be at all times in a direct line with the shaft in accordance with the action of the vane.

According to this invention, the guides are arranged to oscillate in the rotor of the pump or other construction to which the invention is applied, and oscillate about their own centres to follow the direction of movement of the vanes, and the guides extend within the casing so as to use the maximum bearing surface available for the vanes relatively to the guides and of the guides relatively to the surface of the rotor.

It is an important object of the invention to provide compressors, pumps, air and hydraulic engines, flow meters and the like, which convert the normal piston principle into the rotary vane principle, resulting in the great advantage that the size of any unit of given capacity may be at least halved, for the reason that the unit does effective work twice in each revolution of the rotor.

Known rotary vane type heat engines have not been successful for the reason that the centrifugal force through the vanes against the wall of the casing, the high surface speed and the low bearing surface area at the end of each vane, together with the lack of effective lubrication, combined to make such engines very inefficient.

By the application of the present invention to vane type heat engines, they may be made particularly effective and efficient.

For the purpose of this specification the invention will be described with reference to a rotary vane type air pump employing two vanes enclosed in the centre of the pump casing and working within an offset or eccentric rotor from which they emerge and into which they retract as the rotor revolves, sealing strips on the outer edges of the vanes making wiping contact with the inner wall of the pump casing, which is provided with inlet and outlet ports.

Figure 13:
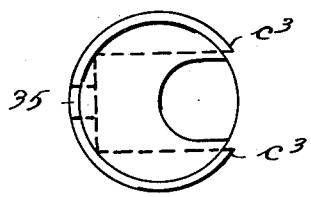
Figure 14:
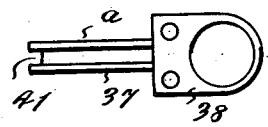
Figure 15:
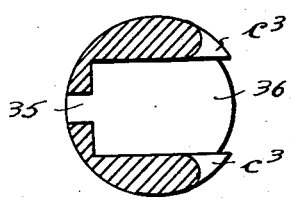
Figure 16:
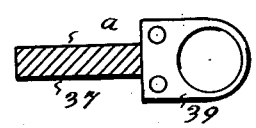
Figure 17:
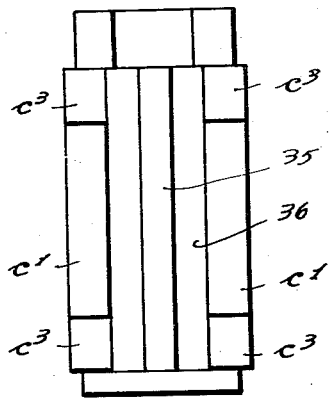
Figure 18:
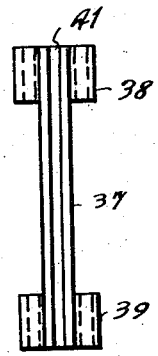
Figure 19:
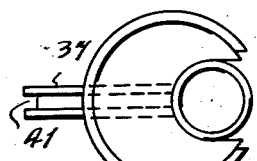
Figure 21:
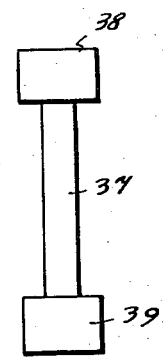
Figure 20:
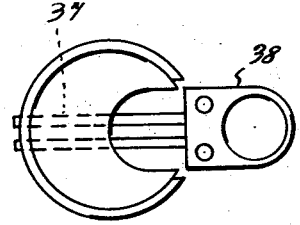
Figure 22:
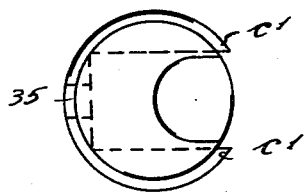
Figure 23:
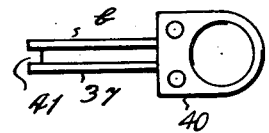
Figure 24:
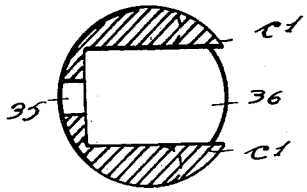
Figure 25:
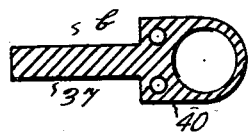
Figure 26:
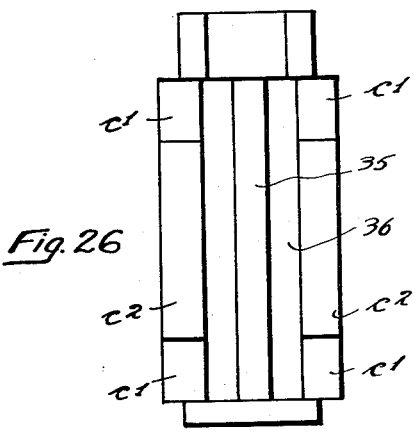
Figure 27:
Figure 28:
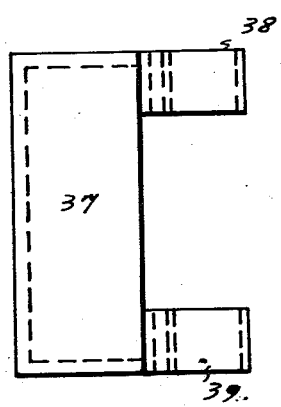
Figure 29:
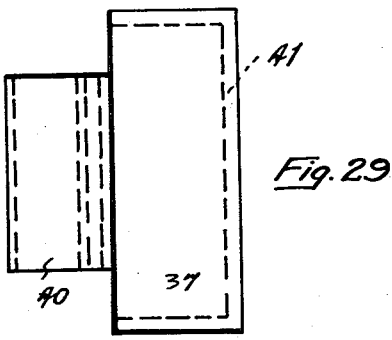
Figure 30:
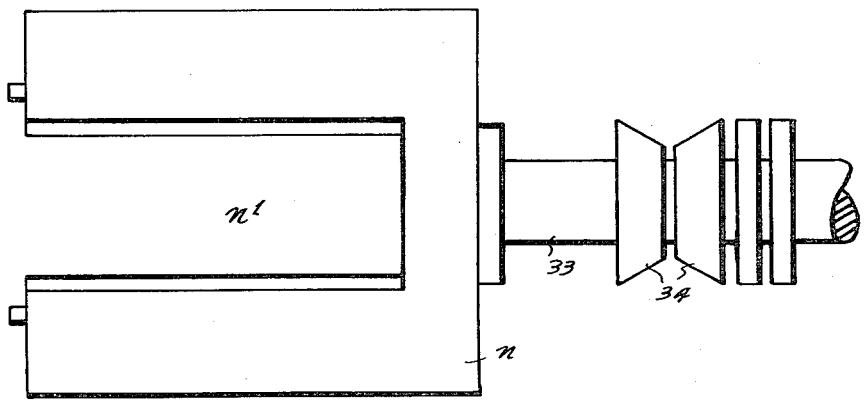
Figure 31:
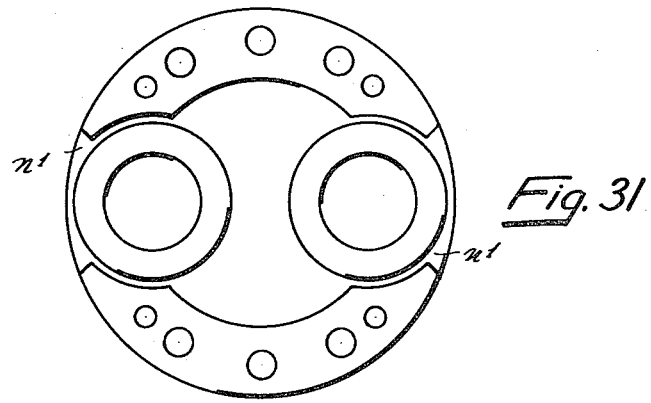
Figure 32:
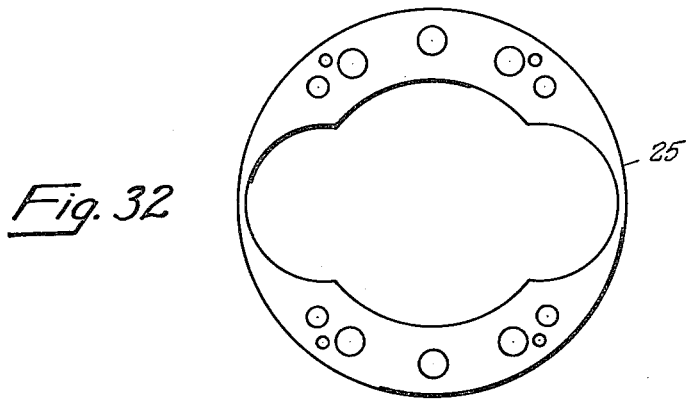

For a full understanding of the invention attention is directed to the accompanying drawings, wherein:

FIGURES 1 to 6 are diagrammatic representations illustrating the positions of the vanes as the rotor rotates in the casing;

FIGURES 7 to 12 illustrate the relative positions of the rotor, the vanes and the vane guides, as the rotor rotates;
FIGURE 13 is a plan view of one vane guide;
FIGURE 14 is a plan view of the vane associated with the guide shown in FIGURE 13;
FIGURE 15 is a cross sectional plan of the vane guide shown in FIGURE 13;
FIGURE 16 is a cross sectional plan of the vane shown in FIGURE 14;
FIGURE 17 is a front elevation of the vane guide shown in FIG. 13, and,
FIGURE 18 is a front elevation of the associated vane;
FIGURE 19 is a plan view showing a vane in its vane guide and projecting partly therefrom;
FIGURE 20 is a plan view showing a vane retracted into its vane guide;
FIGURE 21 is a rear elevation of the vane shown in FIG. 14;
FIGURE 22 is a plan view of the second vane guide;
FIGURE 23 is a plan view of the second vane;
FIGURE 24 is a cross sectional plan of the second vane guide;
FIGURE 25 is a cross sectional plan of the second vane;
FIGURE 26 is a front elevation of the second vane guide;
FIGURE 27 is a front elevation of the second vane;
FIGURE 28 is a side elevation of the first vane;
FIGURE 29 is a side elevation of the second vane;
FIGURE 30 is a side elevation of the rotor, showing the bifurcated construction thereof;
FIGURE 31 is a plan view looking into the rotor;
FIGURE 32 is a front elevation of an end plate arranged to be placed over the open end of the rotor;
FIG. 33 is a schematic cross-sectional view of an assembled apparatus; and
FIG. 34 is a longitudinal sectional view taken on line 34 of FIG. 33.

In the drawings the reference character $p$ indicates the pump casing, in which is arranged to be driven an offset or eccentrically mounted rotor $n$ supported in a substantial bearing at one end of the pump casing, said rotor being mounted on a shaft 33 (FIG. 30) which passes outside of the casing where it is connected with driving means for rotating the rotor at desired speeds.

The arrangement illustrated employs two vanes $a$ and $b$ and two vane guides $c$ and $d$.

The operation of the air pump is shown in FIGURES 1 to 12 of the accompanying drawings, and by reference thereto, it will be seen that as a vane guide $c$ approaches the central, common locating shaft or control shaft $e$ a slot $s$ in the vane guide will pass over the shaft, for the reason that the slot $s$ is always in a direct line with the shaft.

In FIGURES 1 to 12 there are illustrated the positions and general relative arrangements of the parts as the rotor rotates from a point at top dead centre, or that is to say, from a point which would be equivalent to top dead centre in a piston engine. It will be seen that vane $a$ passes around to the position previously occupied by vane $b$ and vane $b$ moves around to the position initially occupied by vane $a$, in one half of a revolution, and on the completion of a revolution the vanes will have returned to their initial positions.

As the rotor rotates, air in area $f$ is compressed into area $g$, in one half of a revolution, and passes to the exhaust manifold through a port such as one of the ports 42 (FIG. 33), which may be associated with a suitable valve, such as a flap valve.

The vane guides $c$ and $d$ and the vanes $a$ and $b$ are so machined as to take advantage of the maximum possible bearing surfaces, and these surfaces are case hardened and ground and milled on the vane guides which are preferably of Phosphor bronze.

A slot $s$ is machined in the vane guides $c$ and $d$ to allow clearance for the passage of the shaft $e$, and the edge slots 41 in the edges of the vanes $a$ and $b$ are arranged to receive strips $t$ of sealing material, which may be that substance sold under the registered trademark "Ferrobestos." The strips of sealing material form the contact surfaces of the vanes with the inside of the pump casing.

The arrangement as a whole comprises a rotor offset or eccentrically mounted relative to the cylindrical casing and relative to a locating shaft which is centrally mounted in the pump casing, the rotor carrying two vane guides which are slotted longitudinally, the rotor being of bifurcated construction, the vane guides each carrying a vane located by the centrally mounted shaft and rotatable about that shaft with rotation of the rotor and capable of being oscillated during the rotation of the rotor about its axis through the wide clearance provided by the bifurcated construction of the rotor, each of the vane guides being slidable relative to its vane, as the rotor is rotated, to and away from an innermost position in which its inner end portion overlaps or embraces the locating shaft, sealing strips of the vanes at all times, as the rotor is rotating, making wiping engagement with the inner walls of the pump casing.

In accordance with the invention, and by reference to the drawings, it will be seen that the rotor $n$ comprises a cylindrical metal block machined out as a bifurcated member to provide the wide clearances $n^1$, the rotor receiving and housing the vane guides $c$ and $d$.

At one end of the rotor there is a shaft 33 having roller bearings 34, and the forward or open end of the rotor is arranged to be closed off by a plate 25 fixed in place by machine screws.

The shaft of the rotor is suitably supported in substantial bearings in one end of the pump casing and drive is applied to the shaft to rotate the rotor at desired speeds.

The locating shaft $e$ is fixed in the opposite end of the casing and the vanes and vane guides are rotated about this shaft, which is located centrally of the pump casing. While they are being so rotated by the rotation of the rotor, they oscillate relative to the rotor and each vane guide slides relatives to its vane radially to and away from its innermost position in which it embraces the locating shaft.

The vane guides $c$ are machined out preferably from Phosphor bronze billets, and are fabricated as illustrated in the drawings, from which it will be seen that each vane guide has a longitudinal slot 35 and an internal rectangular chamber or slot enlargement 36.

The side wings $c^1$ of one vane guide have an intermediate recess $c^2$, while the side wings $c^1$ of the other vane guide have upper and lower recesses $c^3$, so that when the guides are housed in the rotor, they may mutually interengage and oscillate.

Each vane $a$ and $b$ has a substantial plate 37, which is the vane proper, and one vane has upper and lower blocks 38 and 39 which are drilled vertically, while the other vane has an intermediate block 40, also drilled vertically, the said intermediate block of the one vane being arranged to lie between the upper and lower blocks 38 and 39 of the other vane when each is located in its guide, and the locating shaft $e$ passes through both sets of blocks whereby to mount the vanes.

The guides and the vanes are placed in the rotor and the vane plates 37 and blocks 38, 39 and 40 are arranged to work slidably through the slots 35 and slot enlargements 36 of the vane guides.

Each vane plate 37 has a slot 41 along each edge for the reception of bearing strips of suitable material, such as that material sold under the registered trademark "Ferrobestos," and these strips are the parts of the vanes which make contact with the inner walls of the pump casing.

The end plate 25 on the rotor prevents end movement of the vane guides.

Where the invention is applied to heat engines, the rotor is machined off at the radius of the outside of the pump wall, to make a combustion chamber.

What is claimed is:

1. A vane type rotary device, for use as an engine, pump, fluid compressor, flow meter, or the like, comprising a casing, a locating shaft disposed centrally inside said casing, a rotor disposed eccentrically in said casing and mounted on a rotary shaft for rotation in said casing about an axis fixed to one side of the axis of said locating shaft, a plurality of vane guides carried in said rotor, and a plurality of vanes carried respectively by said vane guides and mounted on said locating shaft for rotation about its axis with rotation of said rotor, each of said vanes extending from said locating shaft to said casing through one of said vane guides and being in continuous wiping contact with said casing while said rotor is rotating, each of said vane guides being formed with a slot portion at least slightly wider than the diameter of and opening radially toward said locating shaft and being mounted for oscillation about an axis of its own fixed relative to said rotor and being slidable relative to its vane in a path radial to said locating shaft as the rotor, vane guides and vanes are rotated together, so that the vane guides and vanes are oscillated relative to the rotor in the course of the rotation, the eccentricity of the rotor and the radial distances of the vane guides from the locating shaft during each rotation of the rotor being such that in the course of each such rotation each of said vane guides slides relative to its vane to a central location at which said slot portion of the vane guide overlaps said locating shaft.

2. A vane type rotary device, for use as an engine, pump, fluid compressor, flow meter, or the like, comprising a cylindrical casing, a locating shaft inside and concentric with said casing, a rotor disposed eccentrically in said casing and mounted on a rotary shaft for rotation in said casing about an axis fixed to one side of the axis of said locating shaft, said rotor being bifurcated to provide in it a chamber having wide side openings at opposite sides of the rotor, said locating shaft extending into siad chamber, two vane guides carried in said rotor chamber, and two vanes carried respectively by said vane guides and mounted on said locating shaft for rotation about its axis with rotation of said rotor, each of said vanes extending from said locating shaft to said casing through one of said vane guides and one of said openings and being in continuous wiping contact with said casing while said rotor is rotating, each of said vane guides being formed with a slot portion at least slightly wider than the diameter of and opening radially toward said locating shaft and being mounted for oscillation about an axis of its own fixed relative to said rotor and being slidable relative to its vane in a path radial to said locating shaft as the rotor, vane guides and vanes are rotated together, so that the vane guides and vanes are oscillated relative to the rotor in the course of the rotation, the eccentricity of the rotor and the radial distances of the vane guides from the locating shaft during each rotation of the rotor being such that in the course of each such rotation each of said vane guides slides relative to its vane to a central location at which said slot portion of the vane guide overlaps said locating shaft.

3. A vane type rotary device, for use as an engine, pump, fluid compressor, flow meter, or the like, comprising a cylindrical casing, a locating shaft inside and concentric with said casing, a rotor disposed eccentrically in said casing and mounted on a rotary shaft for rotation in said casing about an axis fixed to one side of the axis of said locating shaft, two vane guides carried in said rotor, and two vanes carried respectively by said vane guides and each having an inner end portion mounted on said locating shaft for rotation of the vane about said shaft axis with rotation of said rotor, each of said vanes extending from said locating shaft to said casing through one of siad guides and being in continuous wiping contact with said casing while said rotor is rotating, each of said guides being mounted for oscillation about an axis of its own fixed relative to said rotor and being slotted to receive slidably the related vane, so that the vane guides and vanes are oscillated relative to the rotor in the course of their rotation with the rotor, each of said guides being formed at its inner end with a slot portion which embraces said inner end portion of the related vane and reciprocates thereon during each revolution of said rotor, the eccentricity of the rotor and the radial distances of the vane guides from the locating shaft during each rotation of the rotor being such that in the course of each such rotation each of said vane guides slides on the related vane to a central location at which the slot portion thereof overlaps said locating shaft.

4. A vane type rotary device, for use as an engine, pump, fluid compressor, flow meter, or the like, comprising a cylindrical casing, a locating shaft inside and concentric with said casing, a rotor disposed eccentrically in said casing and mounted on a rotary shaft for rotation in said casing about an axis fixed to one side of the axis of said locating shaft, two vane guides carried in said rotor, and two vanes carried respectively by said vane guides and each having an inner end portion mounted on said locating shaft for rotation of the vane about said shaft axis with rotation of said rotor, each of said vanes extending from said locating shaft to said casing through one of said guides and being in continuous wiping contact with said casing while said rotor is rotating, each of said guides being mounted for oscillation about an axis of its own fixed relative to said rotor and being slotted to receive slidably the related vane, so that the vane guides and vanes are oscillated relative to the rotor in the course of their rotation with the rotor, each of said guides being formed at its inner end with a slot portion which embraces said inner end portion of the related vane and reciprocates thereon during each revolution of said rotor, the eccentricity of the rotor and the radial distances of the vane guides from the locating shaft during each rotation of the rotor being such that in the course of each such rotation each of said vane guides slides on the related vane to a central location at which the slot portion thereof overlaps said locating shaft, said slot portion of one of said guides comprising spaced wings at either side of an intermediate recess and said slot portion of the other guide comprising spaced wings aligned with said recess, so that the inner ends of said guides may mutually interengage and oscillate.

5. A vane type rotary device, for use as an engine, pump, fluid compressor, flow meter, or the like, comprising a cylindrical casing, a locating shaft inside and concentric with said casing, a rotor disposed eccentrically in said casing and mounted on a rotary shaft for rotation in said casing about an axis fixed to one side of the axis of said locating shaft, two vane guides carried in said rotor, and two vanes carried respectively by said vane guides and each having an inner end portion mounted on said locating shaft for rotation of the vane about said shaft axis with rotation of said rotor, each of said vanes extending from said locating shaft to said casing through one of said guides and being in continuous wiping contact with said casing while said rotor is rotating, each of said guides being mounted for oscillation about an axis of its own fixed relative to said rotor and being slotted to receive slidably the related vane, so that the vane guides are oscillated relative to the rotor in the course of their rotation with the rotor, each of said guides being formed at its inner end with a slot portion which embraces said inner end portion of the related vane and reciprocates thereon during each revolution of said rotor, the eccentricity of the rotor and the radial distances of the vane guides from the locating shaft during each rotation of the rotor being such that in the course of each such rotation each of said vane guides slides on the related vane to a central location at which the slot portion thereof overlaps said locating shaft, said inner end portion of one of said vanes comprising blocks at either side of an intermediate recess and said inner end portion of the other vane comprising a block fitting in said recess, said blocks being formed with aligned openings receiving said locating shaft to mount said vanes for rotation on said locating shaft.

6. A device as claimed in claim 5, the slot formed in each of said vane guides comprising a relatively narrow outer slot portion to receive the main body of the related vane and a widened inner slot portion to receive slidably said block or blocks of the inner end portion of the related vane.

References Cited in the file of this patent

UNITED STATES PATENTS

| | | |
|---|---|---|
| 1,980,726 | Higbee | Nov. 13, 1934 |
| 2,071,799 | Mabille | Feb. 23, 1937 |

FOREIGN PATENTS

| | | |
|---|---|---|
| 7,110 | Great Britain | of 1909 |
| 923,027 | France | Feb. 10, 1947 |